Jan. 30, 1968 R. W. PARKINSON 3,366,739
BANDWIDTH REDUCTION SYSTEM FOR RECONSTITUTING NON-TRANSMITTED SIGNALS FROM TRANSMITTED SIGNALS
Filed Sept. 30, 1964 4 Sheets-Sheet 1

| FRAME | V | VI | VII | VIII | IX | X |
|---|---|---|---|---|---|---|
| BRIGHTNESS | | | | | | |
| SOURCE | TRANSMITTED | GENERATED | GENERATED | GENERATED | GENERATED | TRANSMITTED |
| GENERATION | 100% (V) | 80% V<br>20% X | 60% V<br>40% X | 40% V<br>60% X | 20% V<br>80% X | 100% X |

INVENTOR.
ROBERT W. PARKINSON
BY
Sidney Magnes
AGENT

INVENTOR.
ROBERT W. PARKINSON
BY
Sidney Magnes
AGENT

INVENTOR.
ROBERT W. PARKINSON
BY
Sidney Magnes
AGENT

INVENTOR.
ROBERT W. PARKINSON
BY
Sidney Magnes
AGENT

United States Patent Office 3,366,739

Patented Jan. 30, 1968

3,366,739

BANDWIDTH REDUCTION SYSTEM FOR RECONSTITUTING NON-TRANSMITTED SIGNALS FROM TRANSMITTED SIGNALS

Robert W. Parkinson, Santa Ana, Calif., assignor to North American Rockwell Corporation, a corporation of Delaware Filed Sept. 30, 1964, Ser. No. 400,311
15 Claims. (Cl. 179—15.55)

ABSTRACT OF THE DISCLOSURE

Apparatus for obviating the need for transmitting a complete train of information, by transmitting only spaced-apart samples, and using these samples to reconstitute the non-transmitted portions of the information train. To generate these non-transmitted portions, an interpolation technique combines progressively different complementary percentages of the samples.

A heuristic example would be to combine 90% of the first sample with 10% of the second sample—thus producing a first non-transmitted portion. A combination of 80% of the first sample and 20% of the second sample produces a second non-transmitted portion. Additional complementary percentages (70%–30%, 60%–40%, 50%–50%, 40%–60%, etc.) of the samples produce other non-transmitted portions of the information-train; and the plurality of reconstituted information-portions are interposed between the two samples.

Thus, this invention relates to bandwidth reduction; and more particularly to the transmission of information, such as television programs, messages, and the like.

*Introduction*

Transmission of high-quality television pictures or of other information requires a characteristic known as "wide bandwidth," a technical term that will be more fully discussed later. Unfortunately, the use of wide bandwidths tend to limit the number of messages that can be transmitted over a given link.

Many attempts have been made to use reduced bandwidths for the transmission of signals; but most of these attempts have either degraded the received information, or have reduced the bandwidth by only a small factor of about two or three.

*Object and drawings*

It is therefore, the principal object of the present invention to provide improved bandwidth-reduction for the transmission of information.

It is another object of the invention to provide reduced-bandwidth signals that can be processed to provide the original information.

It is a further object of the invention to provide apparatus that produces reduced-bandwidth signals, and provides the original information.

The attainment of these objects, and others, will be realized from the following specification, taken in conjunction with the drawings of which:

*Summary*

Figures 1, 2:
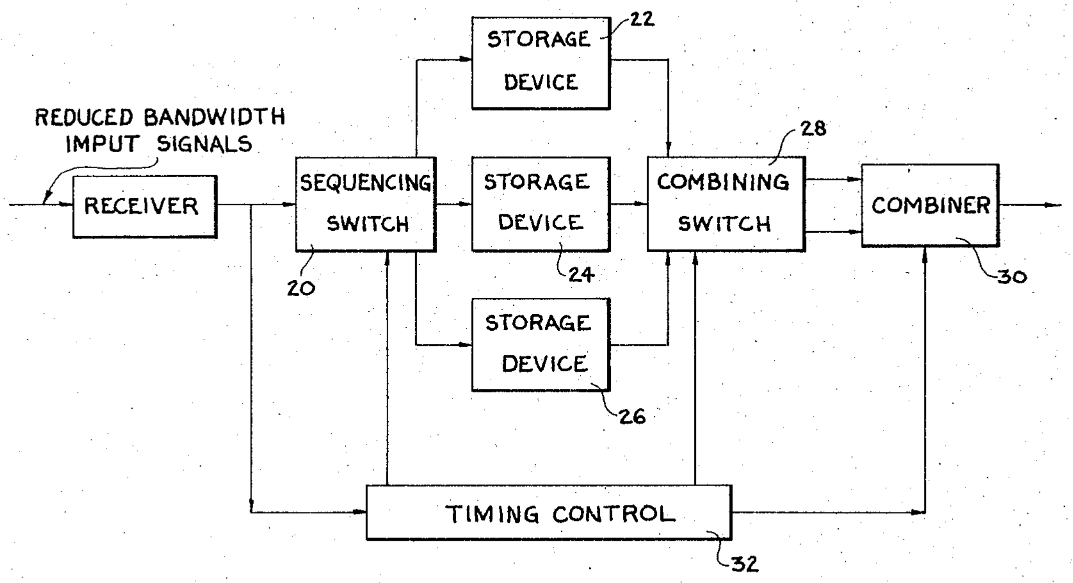
FIG. 1 illustrates the basic inventive concept.
FIG. 2 illustrates a block diagram representation of equipment for practicing the invention.

Broadly speaking, the present invention contemplates the concept of transmitting only pre-selected samples of information; and then using these samples for generating the non-transmitted portions of the information. The generation is achieved by selectively combining various proportions of the received samples, so that corresponding sequentially-generated portions gradually lose the characteristics of the earlier sample, and gradually assume the characteristics of the later sample. In this way the resultant information corresponds to the original information; without the need for transmitting every bit of the original information.

*Background*

For convenience, the present invention will be described in terms of a television system. However, the invention is not to be construed as being limited to television; and other uses will be discussed later.

A brief description of a television tube's operation will be helpful in understanding the invention. It is well known that a television-type tube, more correctly called a cathode-ray tube, has a device that produces a stream of electrons. This stream of electrons impinges upon a film of fluorescent material deposited on the inner surface of the cathode-ray tube's faceplate; and the fluorescent material glows at the point of electron-stream impingement. Well-known circuitry causes the electron stream to "scan," i.e., to sweep back-and-forth and up-and-down in such a manner that it produces a series of glowing parallel lines on the faceplate of the television tube, the series of parallel lines being known as a "raster."

One type of raster, presently used in commercial television, is formed by first producing all the odd-numbered lines, these lines being called the first "field"; and then producing the even-numbered lines, these being called the second "field." The overall effect is that the lines of the first field are "interlaced" with the lines of the second field to produce an interlaced raster or "frame"; a term taken from motion pictures. Alternatively, another type of raster is formed by producing the raster lines sequentially; in which case they will produce a "sequential" raster or frame. The raster is of uniform brightness.

In order to convert the raster to a display, the incoming signal is applied to the television tube in such a manner that it controls the intensity of the electron stream, and thus controls the intensity of the glow at the point of impingement, to produce a raster line having a series of bright and dim spots; the glowing spots of one raster line coacting with the glowing spots of adjacent raster lines to produce the television picture. As the scene changes, the television tube produces a different set of bright and dim spots; and these now coact to produce another television picture.

A special type of cathode-ray tube is used for the television camera, this containing apparatus for producing an electron stream, and for causing the electron stream to sweep back-and-forth and up-and-down; the sweepings of the electron streams in the television camera and in the television tube being synchronized by suitable circuitry.

It was previously stated that a wide bandwith was required to transmit high-quality information, and the concept of bandwidth may be understood from the following simplified explanation. Assume for simplicity, that the television receiver is to display a thin vertical line, such as a dark rope silhouetted against a bright sky. In order for the television tube to reproduce this portion of a scene, a high-intensity electron beam must be swept across a portion of the fluorescent film to produce a bright raster line that represents the bright sky. At the point where the rope is to be shown, the electron stream must be extinguished, so that the fluorescent film shows a black spot. The high-intensity electron stream must then be re-established to show the remainder of the bright sky. Subsequent lines of the television picture must reproduce exactly the same bright-dark-bright arrangement; and the dark spots must be vertically aligned to reproduce the picture of a dark rope against a bright sky.

It will be realized that in order to show a very dark thin rope, the electron stream is required to be extinguished and re-established very quickly; and this requirement calls for equipment that is capable of reacting very quickly to incoming signals. For reasons that are too technical to be discussed here, this fast reaction requires a wide bandwidth.

A narrower bandwidth requirement can be achieved by causing the electron stream to be scanned across the picture at a much slower rate. Under this slow-scan condition, the electron stream intensity may be extinguished and re-established at a somewhat slower rate; that is, it does not have to react as quickly to incoming signals. This slower reaction does not require as wide a bandwidth as the fast reaction.

Another way of considering the situation is to realize that at the slow scan rate, it will require a longer time to transmit a frame of information, and thus, information that is transmitted at the slow-scan rate can use a reduced bandwidth.

*Description of the invention*

The present inventive concept will be explained in terms of a five-to-one bandwidth reduction in the transmission of a television signal, this reduction being achieved by transmitting only every fifth frame of the television program; the fifth, tenth, fifteenth, twentieth, etc., frames being "samples" of the information—the fifth and tenth, tenth and fifteenth, fifteenth and twentieth frames, etc., being proximate samples, or "adjacent pairs" of samples. More specifically, the following example will be presented in terms of transmitting the fifth frame, omitting the sixth, seventh, eighth, and ninth frames; and transmitting the tenth frame. Thus, the sixth, seventh, eighth, and ninth frames are sets, or intermediate portions of the information; the sixth and seventh and eighth, eighth and ninth frames etc., being adjacent intermediate frames. In accordance with the described embodiment of the present inventive concept, the receiver generates the intermediate sixth, seventh, eighth, and ninth frames—which correspond to the non-transmitted portion of the information, so that when the generated information is combined with the transmitted information, the output corresponds to the complete television program.

It should be noted that since the sixth, seventh, eighth, and ninth frames are not transmitted, the television camera can take all of this time to slow-scan the fifth frame. As previously indicated, the electron stream may therefore be slow-scanned at one-fifth its normal speed; thus resulting in a five-to-one bandwith reduction, and resulting in a reduced-bandwith signal.

Referring now to FIG. 1, there is symbolically shown the manner in which a particular area of a television picture may change its brightness over the course of a number of frames. As shown, frame five has a black spot. The spot gradually increases in brightness through frames six, seven, eight, and nine; until it is at its maximum brightness in frame ten, or element.

Utilizing the present inventive concept, only samples comprising the information of frames five and ten is transmitted; circuitry, according to the invention, using these samples for generating the brightness of the spot for the intermediate frames six, seven, eight, and nine.

The generation is performed as follows. The brightness values for frames five and nine are stored, in a manner to be described later. FIG. 1 shows that frame six has a slightly brighter element than frame five; and has been generated by combining 80% of the brightness of frame five with 20% of the brightness of frame ten. As a result, in frame six the spot has lost some of the darkness of sample five, and has assumed some of the brightness of sample ten.

In a like manner, frame seven has been generated by combining 60% of the brightness of frame five with 40% of the brightness of frame ten. As a result, the brightness of the spot of frame seven is slightly higher than that of frame six.

Similarly, frames eight and nine have been reconstructed by combining predetermined portions (40% and 60%, and 20% and 80% respectively) of the brightness of frames five and ten. It may thus be seen that even though frames six, seven, eight, and nine were not transmitted, the receiver has generated frames having their brightness.

In frame ten, the spot has the brightness of the transmitted signal; or, stated in another way, comprises 0% of frame five and 100% of frame ten.

It will be noted that each intermediate frame is generated by combining weighted representations formed by using complementary percentages (0–100, 20–80, 30–70, 40–60, etc.) of adjacent samples; and that successive frames are generated by using different complementary percentages. Thus, the weighted representations and the interpolated values take the same form as the sample; be they elements, lines, frames, etc.

The differential combination of complementary percentages illustrated in FIG. 1 has been performed in the so-called "linear" manner; this term merely indicating that the complementary percentages used (100–0, 80–20, 60–40, 40–60, 20–80, 0–100) have changed in a uniform, or "linear," manner. Under some conditions, it may be desirable to generate the intermediate adjacent frames in a non-linear manner; for example, by using complementary percentages of 100–0, 95–5, 90–10, 70–30, 40–60, 0–100. Alternatively, the brightness of the generated frames may be graduated in any other desired manner; or in a manner that is more pleasing to the eye.

It will now be realized that as the eye watches the portion of the frame shown in FIG. 1, the eye will see this particular area become gradually brighter; even though the gradual brightening had not been transmitted. Since sequential television pictures comprise areas wherein the brightness has changed, the disclosed concept permits the generation of the intermediate frames to provide the overall sequence of television pictures.

Under some conditions it may be desirable to transmit different samples than those illustrated, for example, every tenth frame—rather than every fifth frame; with the apparatus generating the intermediate frames, in this way providing even greater (ten-to-one) bandwidth reduction.

The above-described technique of using every fifth frame may be called "snap-shotting," because these frames are stored at the transmitter—as though they were snap shots—by means such as a storage-tube; and the stored frames are sequentially scanned at one-fifth the normal scan-rate, in order to produced reduced-bandwidth signals, which are then transmitted.

While the foregoing explanation has been presented in terms of frames, it will be realized that the transmitted signals may relate to fields, messages, sounds, motion pictures, or any other type of continuously-varying information.

FIG. 2 shows a block diagram of apparatus for practicing the invention. Here reduced-bandwidth input signals from a source, such as the previously-described storage tube and a snap-shotting television camera, are rereceived, and and applied to a sequencing switch 20. As previously indicated, the input signals may be samples of non-consecutive sets of a series of sets of information, i.e., sample frames five, ten, fifteen, twenty, etc., of the series of frames comprising a television program. Sequencing switch 20 sequentially directs the incoming samples to three different storage devices 22, 24, and 26;

that is, the information of frame five is directed to the first storage device 22, the information for frame ten is directed to the second storage device 24, the information for the frame fifteen is directed to the third storage device 26, the information for frame twenty is directed to the first storage device 22—from which the initial frame-five information has been erased, etc.

It will be understood that the information representing frame five is received and stored in the first storage device 22, during the time interval occupied by the transmitted frame V and the non-transmitted frames six, seven, eight, and nine. At the end of this time interval, information representing frame ten is received and stored in the second storage device 24 during the interval occupied by the transmitted frame X and the non-transmitted frames eleven, twelve, thirteen, and fourteen. Thus, at the end of frame fourteen, the first storage device 22 contains the information corresponding to frame five, and the second storage device contains the information corresponding to frame ten.

During the time interval extending from frame fifteen to frame nineteen, the third storage device 26, is being loaded; and simultaneously the frame-five information from the first storage device 22 and the frame-ten information from the second storage device 24 are applied, by means of a combining switch 28, to a combiner 30; which generates the intermediate frames six, seven, eight, and nine by combining percentages of frame five and ten, previously explained.

When the combiner 30 has produced the tenth frame, by combining 0% of frame five and 100% of frame ten, the combining switch 28 takes the frame-ten information from the second storage device 24, and the frame-fifteen information from the now-loaded third storage device 26; and applies these informations to combiner 30, which then generates intermediate frames eleven-fourteen. In this way the input to the combiner comprises pairs of adjacent samples, and the output from the combiner represents all of the frames, every fifth frame being information that has been telecast, while the intermediate frames have been generated.

A timing control 32 uses transmitted sychronizing pulses contained in the reduced-bandwidth signals to synchronize the overall system; the timing control 32 being a computer, a tape, circuitry, and/or other suitable devices that produce signals to activate the various switches, cause the storage devices to be erased so that new information can be applied, etc.

Thus, the disclosed invention provides the desired information, even though only a small portion, such as one fifth, has been actually transmitted. Due to the reduced rate of transmission, and the disclosed generation of intermediate information, a reduced-bandwidth requirement is achieved.

While the inventive concept has been described in terms of a television system, it will be realized that it is also applicable to systems that comprise sounds or other types of more-or-less continuously-varying information. Alternatively, the orginal information may be frames of a moving-picture program; in which case the combiner may take the form of variable-density-filters, for combining specified percentages of light.

Figure 3A:
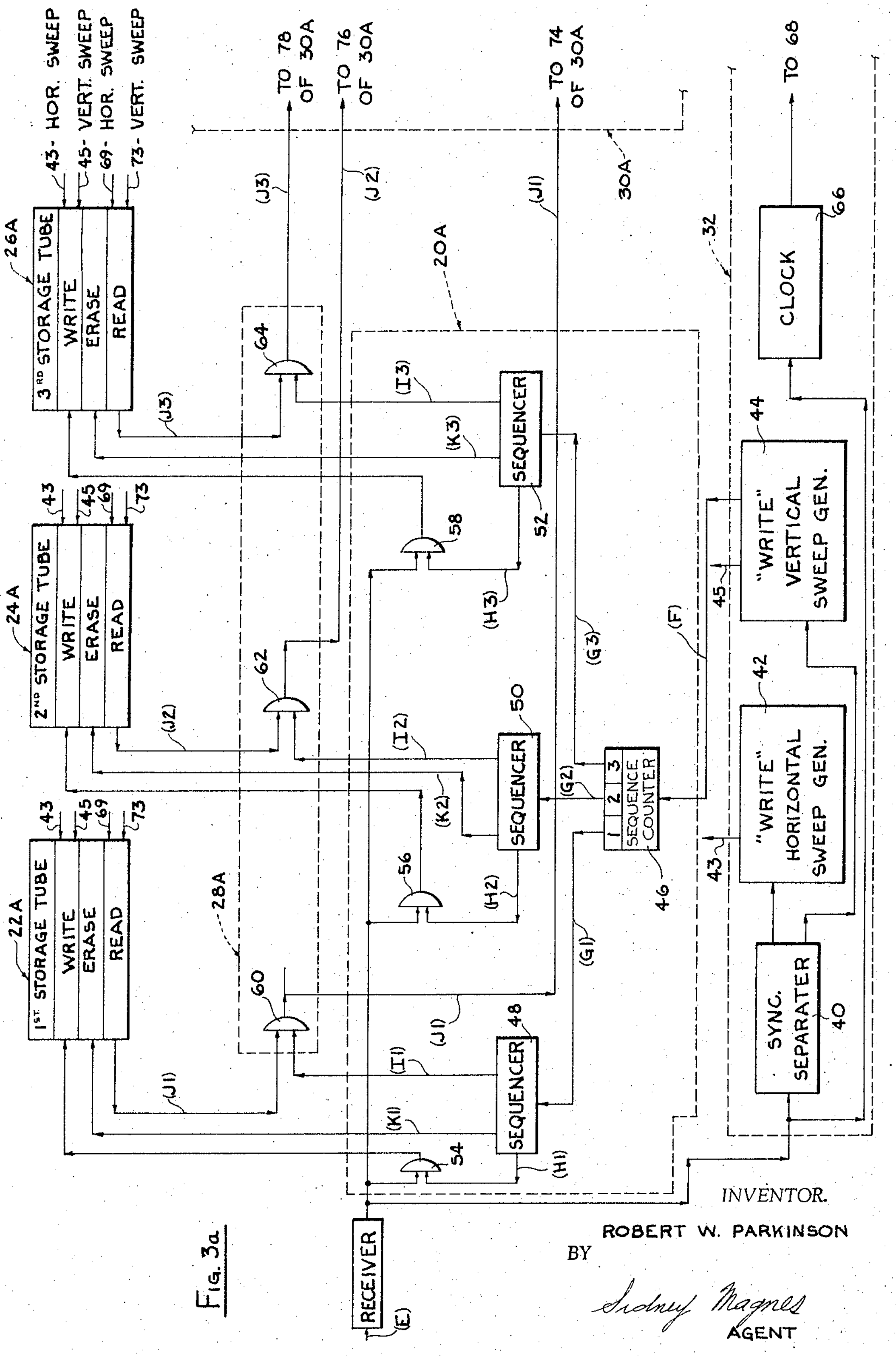
FIG. 3 illustrates a block and schematic diagram of one embodiment of the invention.
Figure 3B:
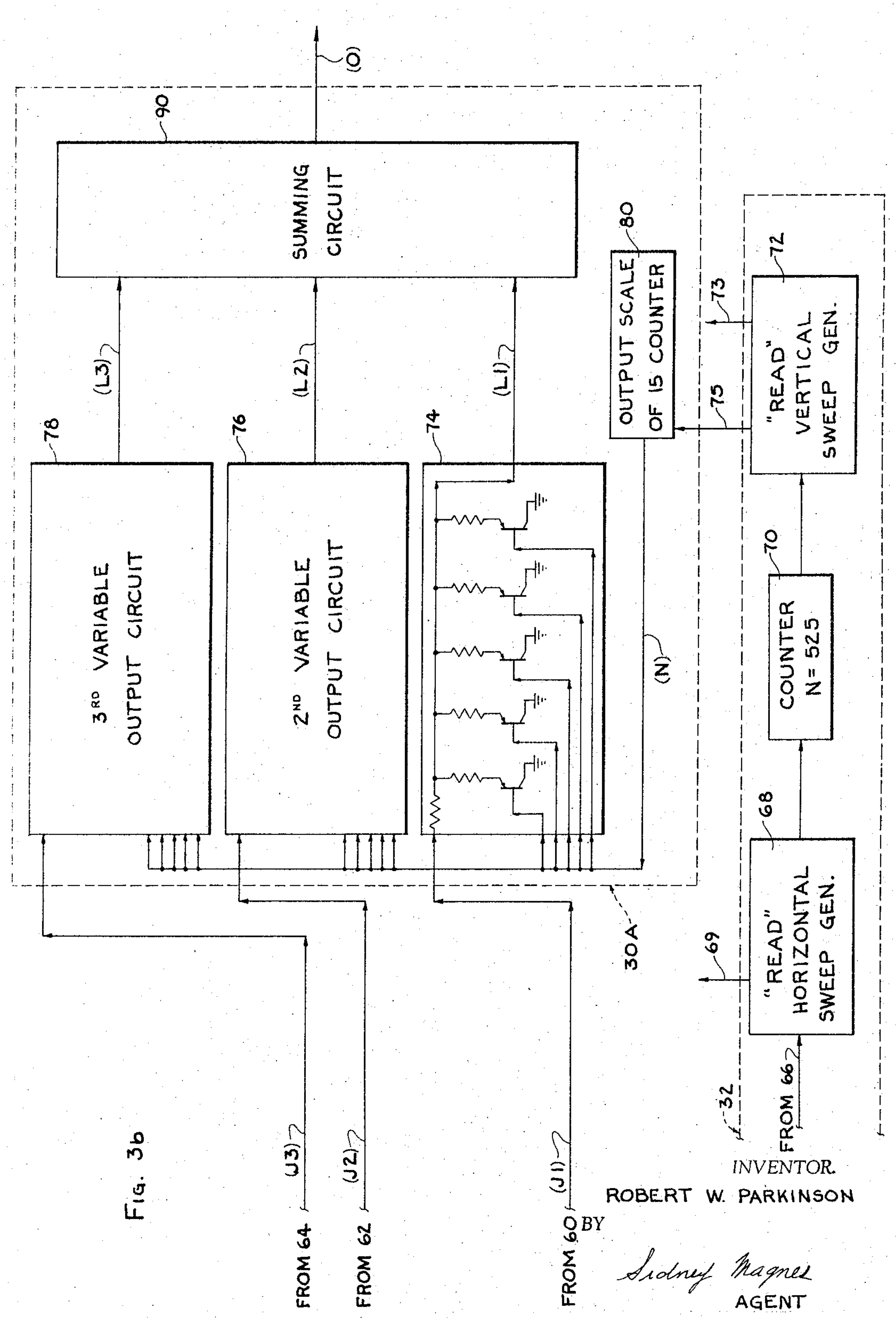
Figure 4:
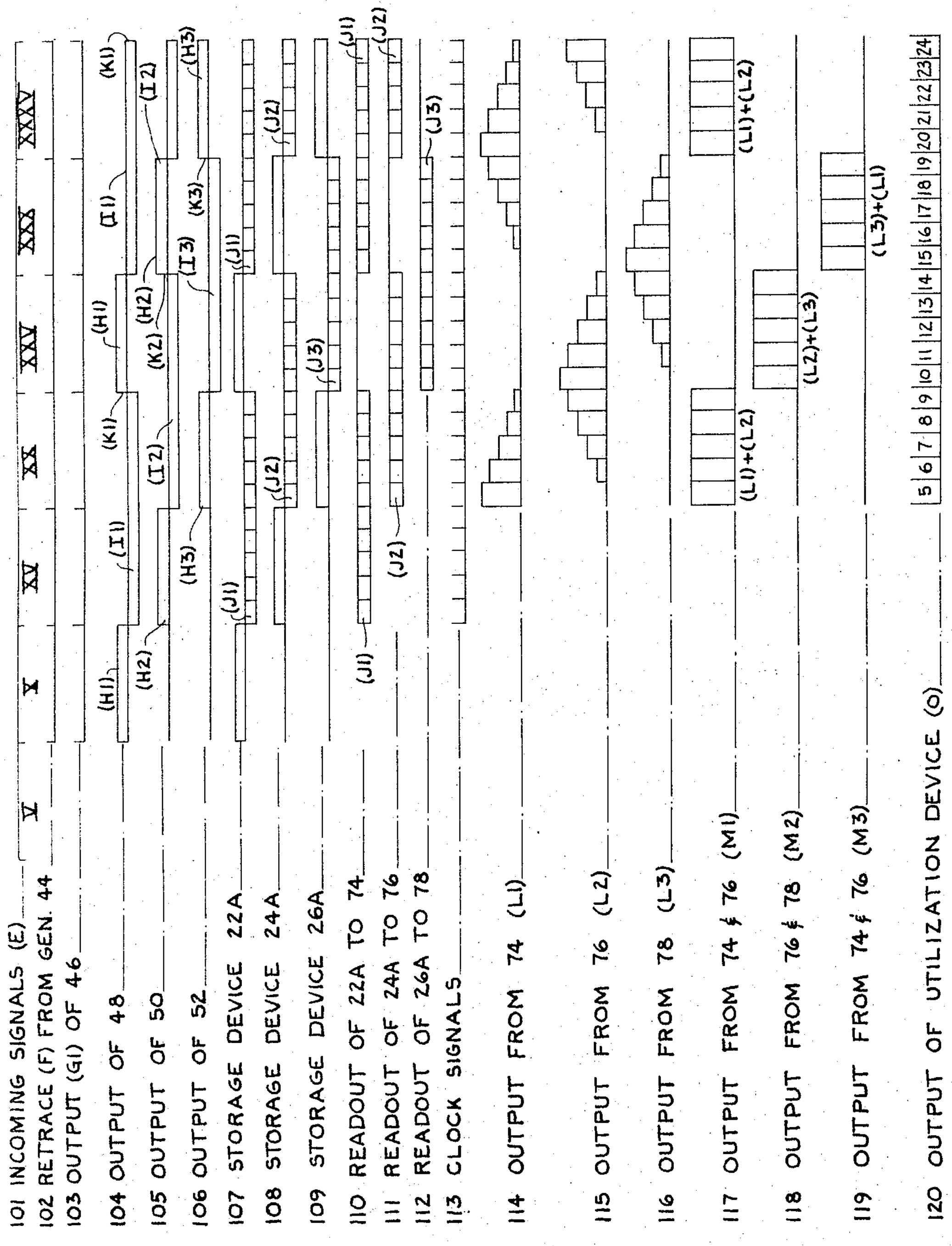
FIG. 4 is a timing chart that symbolically illustrates the time-relations.

FIG. 3 shows details of an embodiment of the invention for use in conventional television, the various portions being numbered to correspond to the reference characters previously used; and FIG. 4 shows a timing chart of the signals associated with the apparatus shown in FIG. 3—the two figures to be studied concurrently. In FIG. 3, the incoming reduced-bandwidth signals (E), represent every fifth frame, and occur—for example—at the rate of twelve frames per second i.e., at one-fifth the rate of conventional television systems ($60 \div 5 = 12$). These incoming signals are applied to timing control circuit 32, wherein a synchronizing-signal separator 40 separates the "horizontal" and "vertical" synchronizing pulses contained in the incoming signals, and applies the separated synchronizing pulses to a "write" horizontal sweep generator 42, and to a "write" vertical sweep generator 44 respectively. The output of these generators is applied via wires 43 and 45 to the "write" portions of each of three storage devices 22A, 24A, and 26A; the connections being indicated, rather than fully shown. Many suitable storage devices are available, one being the model CK7575/QK787 recording storage tube made by the Industrial Tube Division of The Raytheon Company of Newton, Mass.

The "retrace" portion (F) of the vertical sweep signal produced by the "write" vertical sweep generator 44, is applied to a sequence counter 46.

For simplicity, the following explanation will be first presented in terms of the separate operations of each storage tube. Using this mode of explanation, the operation of sequence counter 46 is such that upon receipt of a vertical retrace signal (F) from sweep generator 44, the sequence counter 46 applies a signal (G1) to first sequencer 48; FIG. 4 lines 101, 102, and 103 showing the time-sequence of the pertinent signals thus far discussed.

Referring again to FIG. 3, during a first five-frame time interval, sequencer 48 applies a "write" enabling-signal (H1) to a "write" gate 54 that is continuously receiving the incoming reduced-bandwidth signal (E). Under the influence of the "write" enabling-signal (H1), the write gate 54 applies the incoming frame-five information to the "write" portion of the first storage tube 22A.

At the end of the first five-frame time interval, sequencer 48 terminates the (H1) write-pulse, so that no further information is applied to the first storage tube 22A. Instead, sequencer 48 now applies a "read" enabling-signal (I1) to a "read" gate 60. Under the influence of the "read" enabling-signal (I1), the (J1) information stored in the first storage tube 22A is repeatedly readout at a rapid rate, and applied to a combiner 30A; these operations to be described later.

At the end of the third five-frame time interval, sequencer 48 terminates the (I1) read pulse, and applies an erase pulse (K1) to the first storage tube 22A.

To summarize, during the first time interval, the incoming information is stored in the first storage tube 22A; during the second and third time intervals the stored information is repeatedly readout at a rapid rate into a combiner 30A; and at the end of the third time interval the first storage tube 22A is erased, preparatory to receiving new information.

This cyclic sequence is shown in FIG. 4 at lines 104 and 107; line 104 showing the signals produced by sequencer 48, and line 107 showing the input and outputs of storage device 22A—the readout portion indicating the rapid repetitive readout of the stored information.

The second storage tube 24A, and its associated circuitry, operates in the same manner as described above, except that its write, read, and erase operation—as controlled by sequencer 50—is time-offset from that of the first storage tube—as shown by lines 105 and 108 of FIG. 4, as compared with lines 104 and 107. During the second time interval, sequencer 50 produces a write enabling signal (H2); and write gate 56 therefore passes incoming (E) information into the second storage tube 24A. At the end of the second time interval, sequencer 50 terminates the write enabling signal (H2), and applies a read enabling signal (I2) to read gate 62, whereby stored information (J2) is rapidly and repetitively read into combiner 30A. At the end of the fourth time interval, the read pulse (I2) is terminated, and the second storage tube 24A is erased under control of an erase signal (K2) from sequencer 50.

The third storage tube 26A is similarly loaded, unloaded, and erased—as controlled by sequencer 52—in a further time-offset manner—as shown by lines 106 and 109 of FIG. 4. During the third time interval, incoming information is written into storage tube 26A after being passed through write gate 58 which is enabled by a write enabling signal (H3 from sequencer 52. At the end of the third time interval the write enabling signal (H3) is terminated and sequencer 52 initiates a read enabling signal (I3) to enable read gate 64, whereby information (J3) stored in storage tube 26A during the previous time interval may be read out to combiner 30A. At the end of the fifth time interval the read enabling signal (I3) is terminated, and an erase signal (K3) is provided by sequencer 52 to prepare the storage tube 26A for reception of information in the next time interval.

Accordingly, as will be seen from lines 107, 108, and 109 of the timing chart of FIG. 4, incoming information is written into and read out of the three storage tubes in consecutive alternation; lines 110, 111, and 112 showing that the storage tubes are likewise read out in consecutive alternation.

It will be recognized that the sequence counter 46 acts as a rotary switch that applies signals to the various sequences; and that the sequencers 48, 50, and 52 also act as rotary switches that apply "write," "read," and "erase" signals to the storage tubes. In the above illustration, the switching is performed by logic circuits, rather than by rotary switches.

After each incoming frame of reduced-bandwidth information is stored in one of the storage tubes, it is read out, and applied in a paired manner to combiner 30A. For example, a comparison of the columns of FIG. 4 shows that during the receipt of frame-twenty information (line 101), (J1) and (J2) information—lines 110 and 111—are both being read out simultaneously; and are being applied in a paired manner to variable output circuits 74 and 76. In a like manner, during receipt of frame twenty-five information (line 101), (J2) and (J3) information—lines 111 and 112—are being read out to variable output circuits 76 and 78. Similarly, during receipt of frame-thirty information (line 101), (J3) and (J1) information—lines 112 and 110—are being read out to variable output circuits 78 and 74. The above sequence of operations is cyclically repeated, so that combiner 30A has available to it the paired sequential outputs of the storage tubes.

The overall operation of combiner 30A is as follows. It first receives, at variable-output circuit 74, five frames of the (J1) signal representing frame-five information; and simultaneously receives, at variable output circuit 76, five frames of the (J2) signal representing frame-ten. It then receives, at variable output circuit 76, five-frames of the (J2) signal representing frame-ten, and simultaneously receives at variable output circuit 78, five frames of the (J3) information representing frame fifteen. It next receives, at variable output circuit 78, five frames of the (J3) information representing frame fifteen; and simultaneously receives, at variable output circuit 74, five frames of the (J1) signal representing frame-twenty—this frame-twenty information replacing the original frame-five information; etc. This paired reception sequence is shown in lines 110, 111, and 112 of FIG. 4. In this way, combiner 30A continually receives pairs of information representing transmitted adjacent samples.

The illustrated combiner 30A operates in the following manner. As shown in FIG. 3*a*, the combiner 30A is activated by signals from the timing control 32, these signals being produced as follows. The incoming reduced-bandwidth signals (E) applied to timing control 32 are also applied to a clock 66 that produces "clock" signals at five times the rate of the reduced-bandwidth input signals. These increased rate clock-signals (shown in line 113 of FIG. 4) are applied, FIG. 3*b*, to a "read" horizontal sweep generator 68 whose output is applied over wire 69 to the "read" portion of the storage tubes as indicated. Simultaneously, signals corresponding to the horizontal "read" sweep rate are applied to a counter 70 that counts up to 525 (the number of horizontal lines in the conventional television picture), and applies an output signal to a "read" vertical sweep generator 72, whose output is also applied to the "read" portion of the storage tubes as indicated by wire 73; the retrace portion of the output signals being applied over a wire 75 to an output scale-of-fifteen counter 80 whose operation will be explained later.

In this way, the "write" portions of the storage tubes receive horizontal and vertical sweep signals at a slow rate (from "write" sweep generators 42, 44), whereas the "read" portions of the storage tubes receives horizontal and vertical sweep signals at a high rate (from "read" sweep generators 68, 72) that corresponds to the rate used in conventional television—resulting in the rapid-rate readout indicated in lines 107–112 of FIG. 4.

The purpose of combiner 30A is to combine complementary percentages of the transmitted samples of information; and it therefore accepts ten frames of (J2) information, as shown in the line 111 of FIG. 4, and—for one five-frame interval—produces an output (L2) of line 115, that varies from zero percent of the (J2) input signal to 100% of the (J2) input signal; and for the next five-frame interval produces an output that varies from 100% of the (J2) input signal to zero percent of the (J2) input signal, as also shown in line 115 of FIG. 4.

During this second five-frame interval, the combiner accepts five frames of (J1) information, as shown in line 110 of FIG. 4, and produces an output (L1) of line 114 that varies from 100% of the (J1) input signal to zero percent of the (J1) input signal, as shown in line 114 of FIG. 4. It will be noted that the (L1) and (L2) signals, line 114 and line 115, are varying differentially, that is, (L1) is decreasing while (L2) is increasing. At all times, however, the instantaneous (L1) and (L2) signals are complementary, so that they can be added to produce signal (M1), line 117 of FIG. 4, which varies linearly over a five-frame interval from 100% (J1)—zero percent (J2) to zero percent (J1)—100% (J2). The resultant five intermediate frames of signal (M1) are therefore the interpolated intermediate frames of non-transmitted information.

For the next five frames, combiner 30A accepts (J2) and (J3) information, lines 111 and 112 of FIG. 4, and produces the complementary-percentage (L2) and (L3) signals of lines 115 and 116 of FIG. 4; these being combined to form the interpolated intermediate frames (M2) indicated in line 118 of FIG. 4.

Similarly, the (J1) and (J3) signals of lines 110 and 112 are used to produce signals (L1) and (L3) of lines 114 and 116, which are in turn combined to produce the interpolated intermediate frame signal (M3) of line 119.

Combiner 30A may take various forms, the one illustrated in FIG. 3*b* operating as follows. The signals (J1), (J2), and (J3) from the read portion of the storage tubes 22A, 24A, and 26A are applied—in pairs—to variable output circuits 74, 76, and 78 respectively. These circuits—as illustrated in block 74—may comprise elements, such as attenuating resistors, and grounding transistors. In the illustration of block 74, if all the transistors are cut off, the entire input signal (J1) appears at the output. If the first transistor is conductive, its attenuating resistance acts to permit only 80% of the input signal to appear at the output. Similarly, if the second transistor is conductive it allows 60% of the input signal to appear at the output. In a like manner, activating the third or fourth transistors causes the output to be 40% or 20% of the input; and activating the last transistor grounds the signal so that zero percent appears at the output. In this way, selective activation of the transistors causes the output to decrease from 100% to zero percent of the input, and activating the transistors in the opposite direction causes the output to increase from zero percent to 100%.

Each of the variable output circuits 74, 76, and 78 operates in a similar manner, except—as shown by lines 114, 115, and 116 of FIG. 4—they act in a time-offset manner.

The timing of the variable output circuits 74, 76, and 78 is controlled by a scale-of-fifteen output counter 80 that is activated by the "read" vertical sweep generator 72. Retrace signals from generator 72 occur at the end of every frame, so that output counter 80 produces signals that activate specific transistors for the start of each frame. Thus, the output (N) of output counter 80 may be applied over a cable that has wires branched off for each of the variable output circuits 74, 76 and 78.

As indicated in lines 114, 115 and 117 of FIG. 4, first paired signals from output counter 80 simultaneously activate the 100% circuitry of circuit 74 and the zero percent circuitry of circuit 76 to provide the first portion of output signal (M1); second paired signals from output counter 80 simultaneously activate the 80% circuitry of circuit 74 and the 20% circuitry of circuit 76 to provide the second portion of output signal (M1); third, and sequential, paired signals from output counter 80 simultaneously activate complementary circuitry of circuits 74 and 76 to provide the remaining portions of output signal (M1). At the end of the five-frame interval; output counter 80 applies paired signals to the circuitry of circuits 76 and 78, to produce output signal (M2); this being shown in lines 115, 116 and 118 of FIG. 4. Upon the completion of the second five-frame interval, the paired signals from output counter 80 are applied to the circuitry of circuits 74 and 78, to produce output signal (M3), as shown in lines 114, 116 and 119 of FIG. 4. Thus, at the end of fifteen frames, output counter 80 again applies its paired output signals to the circuitry of circuits 74 and 76, as shown by the second group of outputs in line 117.

A utilization device, 90 of FIG. 3, which may be a summing resistance or the like, combines the sequential outputs (M1), (M2), and (M3) into an output signal (0) that includes all the frames; i.e., those telecast and those generated. In the above-described manner, the apparatus of FIG. 3 produces a series of frames—shown in line 120 of FIG. 4—wherein the intermediate frames have been generated by the circuitry, rather than having been telecast.

Although the invention has been described and illustrated in detail, it is to be clearly understood that the same is by way of illustration and example, only and is not to be taken by way of limitation; the spirit and scope of this invention being limited only by the terms of the appended claims.

What is claimed is:

1. Apparatus for generating a series of elements of information from a plurality of samples of the series, comprising:
means for generating a plurality of interpolations between first and second proximate samples of nonconsecutive information elements, said means including means for causing different ones of said interpolations to embody different proportions of said first and second samples.

2. Apparatus for generating a series of elements of information from a plurality of samples of non-consecutive elements of the series, comprising:
means for generating a plurality of interpolations between first and second proximate samples of nonconsecutive elements, different ones of said interpolations embodying different proportions of said first and second samples, said generating means comprising;
means for providing a plurality of differently weighted representations of said first sample and a plurality of differently weighted representations of said second sample, and means for combining weighted representations of the first sample with weighted representations of the second sample to provide the first mentioned plurality of interpolations.

3. Apparatus for generating a series of elements of information from a plurality of samples of non-consecutive elements of the series, comprising:
means for generating a plurality of representations between first and second proximate samples of nonconsecutive elements, said representations embodying different proportions of said first and second samples, said generating means comprising:
means for providing a plurality of increasingly weighted representations of said first sample and a plurality of decreasingly weighted representations of said second sample, and means for combining weighted representations of the first sample with weighted representations of the second sample to provide the first mentioned plurality of interpolations.

4. In a communications system wherein only samples of information are transmitted, the combination comprising:
means for receiving said samples of information; and
means, operatively-interconnected with said receiving means, for generating a plurality of adjacent nontransmitted information having the same form as said samples, said generated plurality of non-transmitted portions being interposed between said samples.

5. In a communications system wherein only samples of information are transmitted, the combination comprising:
means for receiving said samples of information; and
means, operatively-interconnected with said receiving means, for generating a plurality of intermediate nontransmitted portions of said information by combining differently weighted portions of adjacent samples.

6. In a communications system wherein only samples of information are transmitted, the combination comprising:
means for receiving said samples of information; and
means, operatively-interconnected with said receiving means, for generating a plurality of intermediate adjacent non-transmitted portions of said information by combining complementary percentages of adjacent samples.

7. In a communications system wherein only samples of information are transmitted, the combination comprising:
means for storing adjacent samples; and
means for differentially combining complementary percentages of the stored samples to generate a plurality of adjacent non-transmitted portions of said information.

8. In a communications system wherein only samples of information are transmitted, the combination comprising:
a plurality of storage devices;
means for sequentially storing adjacent samples in said storage devices; and
means for combining complementary percentages of adjacent stored samples to generate non-transmitted portions of said information.

9. In a communications system wherein only samples of information are transmitted, the combination comprising:
a plurality of storage devices;
first switch means for sequentially directing adjacent samples to said storage devices;
a combiner; and
second switch means for directing adjacent stored samples to said combiner;
said combiner comprising means for combining complementary percentages of said stored samples to generate non-transmitted portions of said information.

10. In a communications system wherein only samples of information are transmitted, the combination comprising:
a plurality of storage devices;

a first switch means for sequentially directing adjacent samples to said storage devices;

a combiner; and second switch means for directing pairs of adjacent stored samples to said combiner;

said combiner comprising means for differentially combining complementary percentages of said pairs of stored samples to generate non-transmitted intermediate portions of said information.

11. In a communications system wherein only samples of information are transmitted, the combination comprising:

a plurality of storage devices;

a first switch means, comprising "write" logic, for sequentially directing adjacent said samples to said storage devices;

a combiner; and second switch means for directing pairs of adjacent stored samples to said combiner;

said combiner comprising means for differentially combining complementary percentages of said pairs of stored samples to generate a plurality of nontransmitted adjacent portions of said information.

12. In a communications system wherein only samples of information are transmitted, the combination comprising:

A plurality of storage devices;

first switch means for sequentially directing adjacent samples to said storage devices;

a combiner; and second switch means, comprising "read" logic, for directing pairs of adjacent stored samples to said combiner;

said combiner comprising means for differentially combining complementary percentages of said pairs of stored samples to generate a plurality of nontransmitted adjacent intermediate portions of said information.

13. In a communications system wherein only samples of information are transmitted, the combination comprising:

a plurality of storage devices;

a first switch means, comprising "write" logic, for sequentially directing adjacent said samples to said storage devices;

a combiner; and second switch means, comprising "read" logic, for directing pairs of adjacent stored samples to said combiner;

said combiner comprising means for differentially combining complementary percentages of said pairs of stored samples to generate a plurality of nontransmitted adjacent portions of said information.

14. In a communications system wherein only samples of information are transmitted, the combination comprising:

a plurality of storage tubes;

first switch means, comprising "write" logic, for sequentially directing adjacent samples to said storage tubes;

a combiner;

second switch means, comprising "read" logic, for directing pairs of adjacent stored samples from said storage tubes to said combiner;

said combiner comprising means for differentially combining complementary percentages of said pairs of stored samples to generate a plurality of nontransmitted adjacent intermediate portions of said information; and timing means for synchronizing the elements of said combination.

15. In a communications system wherein only samples of information are transmitted, the combination comprising:

a plurality of storage tubes;

first switch means, comprising "write" logic, for sequentially directing adjacent samples to the write section of said storage tubes;

a combiner;

second switch means, comprising "read" logic, for directing pairs of adjacent stored samples from the read section of said storage tube to said combiner;

means for erasing the stored samples from said storage tubes;

said combiner comprising means for differentially combining complementary percentages of said pairs of stored samples to generate a plurality of nontransmitted adjacent intermediate portions of said information; and timing means for synchronizing the elements of said combination.

References Cited

UNITED STATES PATENTS

| | | | |
|---|---|---|---|
| 2,921,124 | 1/1960 | Graham. | |
| 3,051,778 | 8/1962 | Graham | 178—6.8 |

JOHN W. CALDWELL, *Primary Examiner.*

J. T. STRATMAN, *Assistant Examiner.*

UNITED STATES PATENT OFFICE
CERTIFICATE OF CORRECTION

Patent No. 3,366,739 January 30, 1968

Robert W. Parkinson

It is certified that error appears in the above identified patent and that said Letters Patent are hereby corrected as shown below:

Column 2, line 3, "the", first occurrence, should read -- corresponding --; line 5, cancel "corresponding"; line 61, "bandwith" should read -- bandwidth --. Column 3, line 61, "spot." should read -- spot or element. --; line 63, "and nine" should read -- nine, and ten --; line 64, cancel "or element". Column 4, line 69, cancel "and", second occurrence. Column 10, line 22, after "information" insert -- portions --.

Signed and sealed this 2nd day of December 1969.

(SEAL)
Attest:

Edward M. Fletcher, Jr.
Attesting Officer

WILLIAM E. SCHUYLER, JR.
Commissioner of Patents